United States Patent
Nag et al.

(10) Patent No.: US 12,309,065 B2
(45) Date of Patent: May 20, 2025

(54) DISTRIBUTED FLOW STEERING IN CLOUD ARCHITECTURE

(71) Applicant: Microsoft Technology Licensing, LLC, Redmond, WA (US)

(72) Inventors: Vijay Nag, Bangalore (IN); Ashok Nandoori, Frisco, TX (US); Rohit Tripathi, Hyderabad (IN); Sankalp Soni, Hyderabad (IN); Paresh Verma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 18/193,038

(22) Filed: Mar. 30, 2023

(65) Prior Publication Data
US 2024/0333649 A1 Oct. 3, 2024

(51) Int. Cl.
*H04L 47/11* (2022.01)
*H04L 47/125* (2022.01)
*H04L 47/193* (2022.01)

(52) U.S. Cl.
CPC .......... *H04L 47/115* (2013.01); *H04L 47/125* (2013.01); *H04L 47/193* (2013.01)

(58) Field of Classification Search
CPC ..... H04L 47/115; H04L 47/125; H04L 47/193
See application file for complete search history.

(56) References Cited

U.S. PATENT DOCUMENTS

| | | | | |
|---|---|---|---|---|
| 7,047,315 B1 * | 5/2006 | Srivastava | .......... | H04L 67/1008 709/236 |
| 7,512,702 B1 * | 3/2009 | Srivastava | .......... | H04L 67/1001 709/239 |
| 11,528,326 B2 * | 12/2022 | Fieau | ...................... | H04L 67/56 |
| 2010/0217866 A1 * | 8/2010 | Nandagopal | ........ | H04L 67/1012 709/226 |
| 2015/0009830 A1 * | 1/2015 | Bisht | ...................... | H04L 45/54 370/236 |
| 2016/0014241 A1 * | 1/2016 | Tai | ...................... | H04L 12/4641 370/474 |
| 2018/0115601 A1 * | 4/2018 | Qiu | ...................... | H04L 67/1004 |
| 2020/0128083 A1 * | 4/2020 | Fieau | ...................... | H04L 67/567 |

(Continued)

FOREIGN PATENT DOCUMENTS

CN 114500633 A 5/2022

OTHER PUBLICATIONS

Duke, et al., "QUIC-LB: Generating Routable QUIC Connection IDs", In proceedings of Internet Engineering Task Force (IETF), Oct. 24, 2022, 36 Pages.

(Continued)

*Primary Examiner* — David R Lazaro
(74) *Attorney, Agent, or Firm* — Holzer Patel Drennan (57) ABSTRACT

A method for distributed flow steering in a cloud-based architecture includes assigning, by a first server, connection IDs to each of multiple data flows owned by the first server. The connection IDs each include a server ID that uniquely identifies the first server and that is included in a data packet header of each of the multiple data flows owned by the first server. The method further includes identifying, by the first server, a data flow characterized by a data packet header including a connection ID uniquely identifying a second server as the owner of the data flow, and redirecting the data flow to the second server.

17 Claims, 4 Drawing Sheets

(56) References Cited

U.S. PATENT DOCUMENTS

| | | | | |
|---|---|---|---|---|
| 2020/0344205 | A1* | 10/2020 | Majkowski | H04L 61/5007 |
| 2020/0389810 | A1* | 12/2020 | Wang | H04W 28/0268 |
| 2021/0329069 | A1* | 10/2021 | Desmouceaux | H04L 69/164 |
| 2021/0359954 | A1 | 11/2021 | Mestery | |
| 2024/0333649 | A1* | 10/2024 | Nag | H04L 47/115 |

OTHER PUBLICATIONS

International Search Report and Written Opinion received for PCT Application No. PCT/US2024/019346, Jun. 21, 2024, 15 pages.

Kühlewind, et al., "Applicability of the QUIC transport protocol," Internet Engineering Task Force, Internet-Draft draft-ietf-quic-applicability-16, 2022, 14pages.

\* cited by examiner

DISTRIBUTED FLOW STEERING IN CLOUD ARCHITECTURE

BACKGROUND

Transmission control protocol (TCP) aims to provide an interface for sending streams of data between two endpoints. The TCP protocol is connection-based, so it creates and maintains a connection between the receiver and the sender while the data is being passed between them. Any information that travels through the internet is guaranteed to arrive unaltered, or the connection will indicate that an error condition exists.

Quick UDP Internet Connections (QUIC) is a newer protocol designed to be nearly equivalent to a TCP connection while offering a reduction in data transmission latencies. One advantage of QUIC becomes apparent during network-switch events, also referred to herein as "connection migrations," such as that which occurs when a user's internet connection is migrated across two supporting networks (e.g., from a local Wi-Fi hotspot to a cellular network).

If a user's internet connection to a particular website is disrupted due to a migration of the connection from one network to another, preservation of user state information (e.g., saved cookies, browsing data) depends upon the ability to restore the user's connection to the exact same server. Although connection migrations are better supported by the QUIC protocol than TCP, existing solutions are overhead-intensive in terms of memory and bandwidth consumption.

SUMMARY

According to one implementation, a method of distributed flow steering in a cloud-based architecture includes establishing a data flow between a first server and a client device according to a select data protocol. Each packet formatted according to the select data protocol has a packet header including a server identifier (ID). The server ID uniquely identifies the owner of the data flow (e.g., the first server) and is included in data packet headers of multiple data flows owned by the owner. The method further includes receiving packets of the data flow at a second server that is not the owner of the data flow and, at the second server, reading the server ID from the data packet headers to identify the first server as the owner of the data flow. Based on this identification, the second server redirects the data packets of the data flow to the first server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

When a user performs an action that effects a connection migration (e.g., from Wi-Fi network to cellular network), each TCP connection of the user times out one by one. Because the routing components of the network do not recognize the connection on the new network as being the same as the previous connection on the old network, each TCP connection to the server must be completely re-established on-demand in same way as it was initially established. This process induces significant latency.

The QUIC protocol is designed to eliminate this latency by including a connection identifier (ID) in each packet header that uniquely identifies the connection to the server regardless of the source. When using the QUIC protocol, a server that initializes a connection (e.g., the "owner" of the connection) assigns one or more connection IDs to the session (also referred to herein as the "data flow"). In some configurations, the client device is assigned multiple connection IDs and instructed to use a different one each time the migrated from one network to another. These connection IDs can then be used by the server as well as routing components to track a single user device as it moves from one network to another, making it possible to more easily keep a user device associated with a data flow to the server that owns the data flow.

While the use of QUIC connection IDs advantageously facilities connection migrations without a loss in user state data (e.g., browsing history, cookies), this practice generates significant overhead for data centers. In data centers utilizing the QUIC protocol, it is common for the load-balancers to be programmed to make routing decisions based on the connection IDs. In a typical scenario, each server at the data center provides the load balancer(s) with a list of connection IDs associated with each data flow as well as state information pertaining to which of the assigned connection IDs is active at a given point in time. The load balancer(s) maintain open communications with each of the servers to dynamically update this information as connection IDs are cycled in and out of use. This practice can be both memory and processing resource intensive since it entails continuous communications between load balancers and back-end servers.

The above practice is one example of "stateful load balancing." meaning that the load balancer maintains certain information about each user session in memory external to the data flow of the session client device and server. Proper routing depends on the ability of the load balancer(s) to maintain and accurately reference this stored state information. Some types of load-balancing algorithms are inherently stateful. For example, a load balancer selecting servers via a round robin approach (e.g., per a defined pattern) typically maintains a session table to track each active session. This session table stores information such as source IP, source port, destination IP, destination port, and a server ID identifying the server assigned to each session.

In contrast, other types of load balancing algorithms are stateless-meaning, implemented without maintaining state information about each individual session in memory external to the connection itself. For example, a load balancer may create a hash ID based on immutable characteristics of the client connection (e.g., IP address and source port) and statically assign each new web session request to a server assigned to a corresponding range of hash IDs. This approach does not require this load balancer to store a session table tracking information about each active session. Instead, every decision of the load balancer can be executed exclusively based on characteristics of the data packets received at the load balancer.

There exist some advantages to reducing the quantity of state data tracked by the load balancer and, when feasible, implementing stateless load balancing logic.—A load balancer is often a dedicated hardware device supplied by a vendor that runs propriety load-balancing software with network translation operations (NAT) operations performed by specialized chips. Data centers supported QUIC protocol communications typically implement Layer 3 (L3) or layer 4 (L4) load balancers that make routing decisions (e.g., initially assigning each new connection to a back-end server) based on address information extracted from data packets in the data flow for each session. An L3 load balancer makes routing decisions using IPv4 and IPV6 addresses, while an L4 load balancer makes routing decisions based on IP addresses in addition to TCP or UDP port identifiers.—Not all load balancers are programmed to recognize connection IDs or to make routing decisions using connection IDs. Load balancers lacking this stateful logic are less expensive to acquire and operate-both in terms of hardware purchase/lease costs as well as in terms of processing overhead. For this reason, it is desirable to implement stateless load balancing when possible.

As mentioned above, current load balancing solutions that support QUIC protocol data are all stateful since the load balancer maintains listing of connection IDs to map each web session to its owner while the session remains active. This is undesirable due to the high resulting overhead. The herein disclosed technology provides techniques to adapt these existing systems to support connection migration in a stateless manner-meaning, the load balancer does not have to track state information about each session for the exclusive purpose of facilitating connection migration. In scenarios where the disclosed approach is utilized in connection with a stateless load balancing algorithm, such as a hash based on source ID/port information, connection migration is supported in an entirely stateless manner. In other implementations, the disclosed technology is implemented in connection with stateful load balancing algorithms, but overhead is still saved since no information is saved or tracked for the exclusive purpose of supporting connection migrations.

In one implementation, stateless load balancing is realized, in part, by including a server ID within the connection ID field of each data packet header. This server ID uniquely identifies the server that owns the associated data flow within the local network of the server (e.g., a data center including servers the communicate with a same load balancer or group of load balancers). The server ID for a server is included in the connection ID field for each of multiple data flows owned by the server.

In contrast to previous solutions that relied on server-assigned connection IDs frequently cycled in and out of use, the inclusion of the server ID within the connection ID makes it possible for any network entity to uniquely identify the owner of a session (e.g., server that initialized the session) without reference to state information associated with the session.

Advantageously, the inclusion of the server ID within the connection ID field of the data packet header makes it possible to program any server on a network to perform data flow routing based on the connection ID in each data packet header without maintaining or accessing state information associated with each individual session. According to one implementation, backend servers of a data center are tasked with handling routing tasks related to connection migrations that have been traditionally delegated to load balancers. This re-distribution of certain routing tasks eliminates the overhead incurred in the above-described state-based approaches due to the fact that the load balancer no longer needs to maintain and dynamically-update a mapping of connection IDs to different servers as those connection IDs are cycled in and out of use. In addition, the proposed solution-eliminates the need to special-purpose load balancers with logic for connection migration support, making it feasible for data centers to selectively implement less sophisticated and more cost-effective load-balancing hardware (e.g., hardware that cannot be programmed to make state-based routing decisions).

Figure 1:
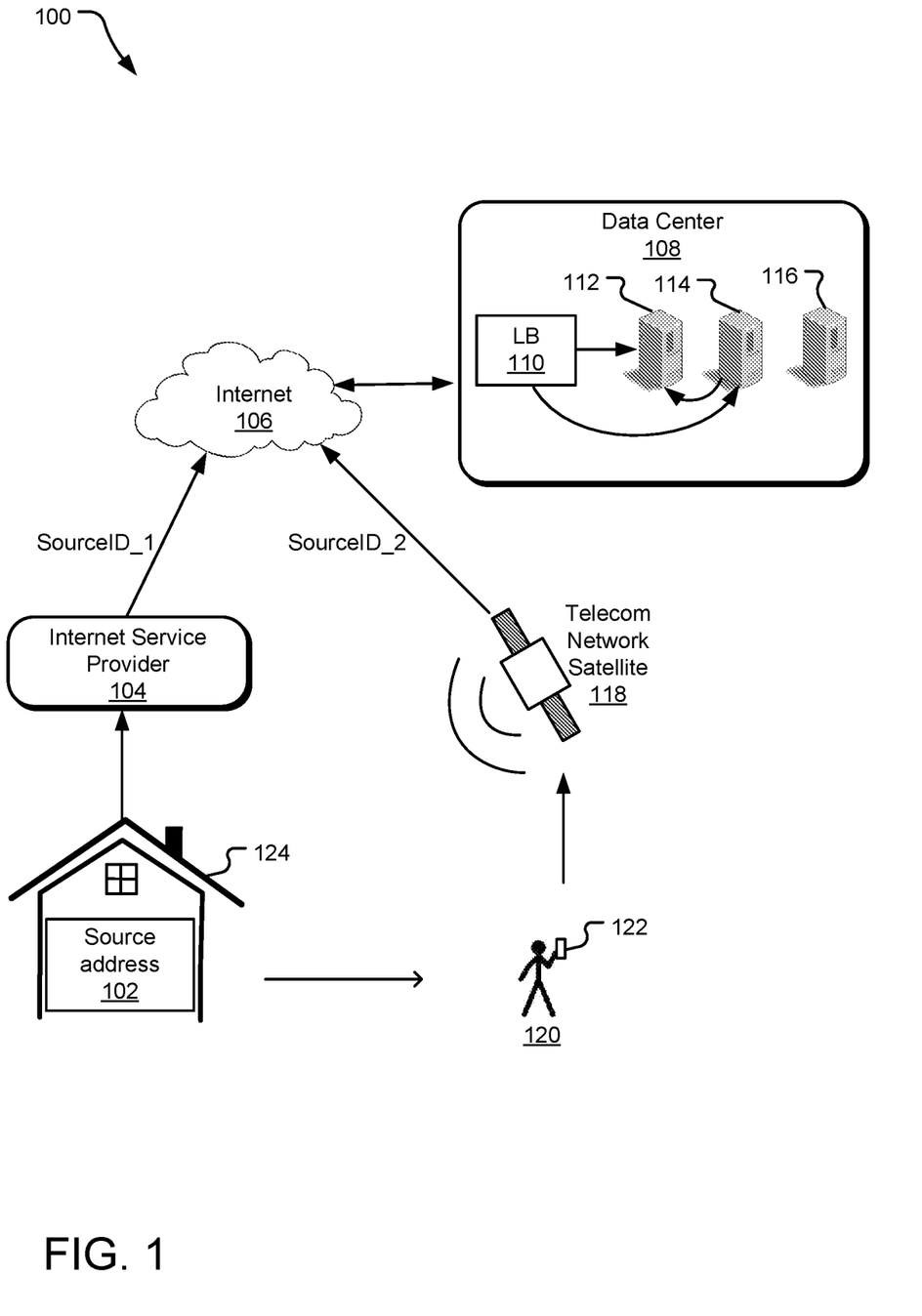
FIG. 1 illustrates an example of a connection migration event in a system implementing distributed flow steering in a cloud-based architecture.

FIG. 1 illustrates an example of a connection migration event in a system 100 implementing distributed flow steering in a cloud-based architecture. The system 100 offloads certain routing tasks to backend servers of the system, allowing the system 100 to implement stateless load balancing logic. In the example connection migration event shown, a user 120 walks from a location inside of a home 124 to a location outside of the home 124 while browsing the internet from a user device 122 (e.g., a mobile phone). This physical relocation of the user device 122 triggers a connection migration event whereby the network supporting the internet connection switches from that of a broadband internet service provider (e.g., ISP 104) to that of a cellular telecom network that is represented in FIG. 1 by telecom network satellite 118.

Although the user device 122 may present information indicating the change in network (e.g., by changing a Wi-Fi symbol to instead indicate a cellular network "5G"), the network switch happens seamlessly such that no delay is noticeable to the user 120. For example, the user may continue, without pause, to complete a series of web-interactions that depend on stored user state information associated with the web browsing session. For example, the user 120 may begin a product purchase on a webpage while using the Wi-Fi connection of the home 124, click a button to initialize payment for the product while walking outside, and then provide payment information in association with the order while connected to the webpage via the cellular network. Since state information is not lost, the user does not have to re-enter information previously provided to the session to complete the purchase after the connection migration has occurred.

Notably, the data packets that the user is transmitting to the internet 106 from the user device 122 include a header that includes a source address 102 that changes when the connection is switched from Wi-Fi to cellular. While the user 120 is in his home, the header in of each data packet arriving at the internet 105 includes an IP address of the user's home modem. When the user walks outside of the range of the Wi-Fi network in the home 124, the connection is intercepted by the telecom network satellite 118 that assigns a temporary IP address to the mobile device that is different from the IP address of the modem in the user's home 124. Consequently, data packets arriving at the internet from the ISP 104 have a first packet source ID and data packets arriving at the internet 106 from the telecom network satellite 118 have a second different source ID (as shown by "SourceID_1" and "SourceID_2" in FIG. 1).

When the user is connected to a website, the content that the user is presented with is typically transmitted to the user from a server (e.g., one of servers 112, 114, and 116) in a data center. Commonly, data centers execute distributed computing tasks, meaning that there exist multiple servers at the data center that are configured to execute a same type of task on behalf of different users. For example, the data center 108 may include 100 servers that are each configured to serve content from any of 10,000 websites hosted by the data center. To mitigate latencies and maximize efficiency through execution of parallel tasks, the data center 108 includes a load balancing system referred to herein as "load balancer 110." The load balancer 110 may include a single hardware unit configured to implement load balancing logic or multiple different hardware units implementing the same or different logic to further the goal of performing load balancing on behalf of the data center 108.

The role of the load balancer 110 is to select an owner (e.g., one of the servers at the data center 108) to manage each different session requested by a various user device. After the load balancer selects an owner for a session, the session owner receives the session request and answers the request with information that varies based on the select communication protocol, which is typically set by the application that the request is directed to (e.g., a web browser). The disclosed technology is described with reference to the QUIC protocol; however, it is contemplated that the technology could be used in conjunction with any data protocol that includes a server-assigned connection ID in the data packet header. Currently, QUIC is the default protocol utilized by Google's Chrome® browser, and QUIC is supported (though not necessarily by default) by Microsoft Edge® and Mozilla Firefox®. The load balancer 110 directs all subsequent traffic of an individual session to the assigned session owner until the session is terminated.

In different implementations, the load balancer 110 implements different load balancing algorithms to select the owner for each session. Example load balancing algorithms including round robin, (e.g., distributing sequential requests according to a simple rotation through available servers), weighted round robin (e.g., round robin adjusted based on the capacity of each individual server), fewest connections (e.g., directing requests to the server with the least number of active connections), IP hash (e.g., using source and destination IP addresses of the client request to generate a unique hash key, which is used to allocate the request to a particular server), least time (e.g., directing requests based on the current response time of each server), equal-cost multi-path (ECMP)(e.g., a strategy that relies on identifying and using next-hop paths of equal cost), or any other suitable routing algorithm.

Notably, most load balancing algorithms use certain immutable characteristics of a session, known as "tuple characteristics," to match data packets of a session to the assigned owner (server) throughout the session. The four tuple characteristics include source IP address, source port, destination IP address, and destination port. In some implementations, this matching occurs statelessly, such as when the load balancer 110 creates a hash of one or more of these tuple characteristics and selects the load balancer associated with a range of hash values that includes the hash. In other implementations, the load balancer 110 tracks certain session state data in a table that associates the tuple characteristics with the IP address of the server (owner) assigned to the session.

In the illustrated connection migration example, the user's action of walking out of range of the Wi-Fi of the home 124 and into the range covered by the telecom network satellite 118 prompt a change in the source IP and source port of the packet header information being sent from the user device 122. Lacking additional logic, the load balancer 110 is unable to recognize the signal from the user device.

In the above-described scenario, the data packets transmitted from the user device 122 are directed to the same owner (e.g., server 112) both before and after the connection migration occurs. Uniquely, the foregoing is realized without storage and or access of session state information by the load balancer 110. Additionally, the connection migration is fully supported without any encoding the load balancer 110 with any special logic for handling connection migration scenarios.

In the disclosed system, the owner (server) assigned to manage the session of the user device 122 assigns a connection ID to the session when responding to the initial HTTP request from the user device 122 specifying a destination IP address. This connection ID is included in all future data packets of the session data flow are sent back and forth between the user device 122 and the owner. Up to this point, the above-described solution is consistent with that implemented in current systems that support QUIC protocol data. Uniquely, however, the system 100 utilizes connection IDs that statically identify the server that owns the corresponding session. For example, the server 112 selects a connection ID that includes a unique self-identifier, such as a private IP address or some other static identifier that uniquely corresponds to the owner's private IP address within its local network (e.g., the data center 108). All connection IDs assigned by the server 112 incudes this same self-identifier, also referred to herein as a Server ID.

In the system 100, the load balancer 110 does not perform any routing actions based on the connection ID. Rather, the load balancer 110 implements routing based on its default logic-which may be either stateless (e.g., using IP hash) or stateful (e.g., keeping a session table to match tuple characteristics of each session to the assigned server owner). Since the load balancer 110 employs logic that routes based on the tuple characteristics, a change to these characteristics, the load balancer 110 is likely to misdirect the data packets arriving immediately after the connection migration occurs. If, for example, the server 112 is the owner of the session with the user device 122, the load balancer 110 may erroneously direct packets of this session to the server 114 following the connection migration.

In the system 100, each of the servers (e.g., 112, 114, 116) is configured to implement static routing logic to redirect data packets that are misdirected by the load balancer 110 due to connection migration events. In the above example where server 112 is the owner but the load balancer 110 sends the data packets to server 114 after the connection migration, the server 114 reads the connection ID in the packets, identifies the server 112 as the session owner, and redirects all incoming packets of the session to the proper owner—server 112. Essentially, the servers 112, 114, and 116 are configured to redirect data packets based on the connection IDs known within the local network. Consequently, the load balancer 110 does not need to store state information for the purpose of supporting connection migration events, and a more basic load balancer may be utilized as a cost-saving measure in lieu of more sophisticated load balancer.

Figure 2:
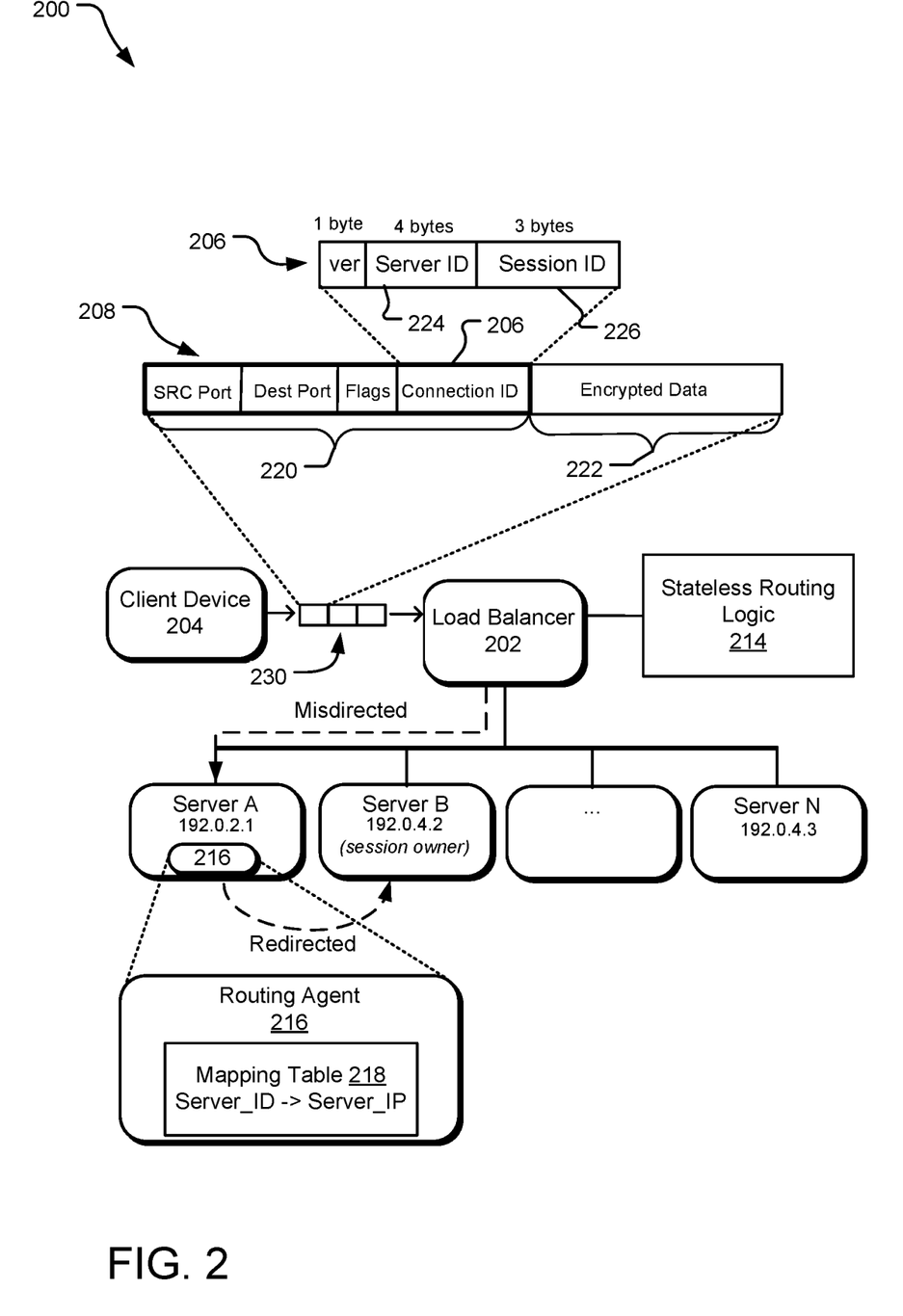
FIG. 2 illustrates an example system that offloads certain routing tasks from a load balancer to backend servers to reduce system overhead and costs.

FIG. 2 illustrates an example system 200 that offloads certain routing tasks from a load balancer to backend servers to reduce system overhead and costs. The system 200 includes a load balancer 202 that implements a load balancing algorithm to select a server (e.g., an "owner") to manage each received client-initiated HTTP session request.

In the illustrated example, the communications are formatted according to the QUIC protocol. However, the disclosed technology is contemplated for use in connection with any data protocol that includes a designated connection ID in the data packet header, where the connection ID is assigned by the owner of the flow and incorporates information designed to allow for identification of a session even if the tuple characteristics of the session change.

In FIG. 2, a client device 204 transmitting a data flow 230 to a load balancer 202 in association with a client web session. At an earlier time when the data flow 230 was first established, the load balancer 202 selected a first server, Server B, as the owner of the data flow 230. This initial selection of Server B from among a plurality of servers networked to the load balancer 202 (e.g., Server A through N) is, in various implementations, performed using multiple different load balancing algorithms.

During a session-initiation handshake (not shown), the selected owner (server B) receives the session initiation request from the client device 204 and transmits back a response that includes a connection ID 206 as well as various other information needed to support the session, such as an encryption key. After the completion of this handshake, the data flow 230 is established and all data packets of the data flow 230 include data fields shown with respect to data packet 208, described below.

The data packet 208 includes a header portion 220 and encrypted data portion 222. The header portion 220 is standard QUIC protocol and includes unencrypted header information including a source port, destination port, flags, and a connection ID 206. Although not shown, the entire data packet 208 may be understood as encapsulated by an IP header that includes a source IP address and a destination IP address.

In the system 200, the connection ID 206 is unique in comparison to existing QUIC protocol systems in that it includes a server ID 224 that uniquely identifies the owner of the associated session. By example, the connection ID 206 is shown to include a 1-byte verification value (e.g., a checksum), followed by the server ID 224 that is 4-bytes in length, followed by a session ID 226 that is 3-bytes in length. Collectively, these three fields add up the 8 bytes allocated for the QUIC connection ID.

The server ID 224 is a static identifier such as a private IP address of the server that owns the associated data flow or other unique identifier usable within the local network to direct traffic to the private IP address of the server that owns the data flow. The Session ID 226 is, in contrast, a session identifier that uniquely corresponds to one of the multiple sessions concurrently being supported by the owner of the associated data flow. For example, the server ID 224 uniquely identifies Server A and is included in the header portion 220 of data packets corresponding to all data flows owned by Server A. In contrast, the session ID 226 identifies a particular one of multiple data flows concurrently being supported by Server A (e.g., the session ID is "19" to identify a particular one of 50 sessions concurrently being managed by Server A).

As in the system 100 described above with respect to FIG. 1, the load balancer 202 performs all routing without storing state information for the purpose of connection migration support. In the illustrated implementation, the load balancer 202 implements stateless routing logic 214, such as by generating a hash value that is based on the source address and source port of the client device 204. This hash value is used to select a corresponding server from a collection of servers available to service the request.

In other implementations, the load balancer 202 implements routing logic that is stateful by default (e.g., storing a session table) but the load balancer does not store state information specifically for the purpose of supporting connection migration events. For example, the load balancer 110 does not store the connection IDs and may not be able to route data using the connection IDs.

When a connection migration occurs, the web session of client device 204 is effectively handed off between two different supporting networks (e.g., two different Wi-Fi networks, Wi-Fi to cellular or vice versa, or between two different cellular networks), such as in the manner illustrated by FIG. 1. When this occurs, a source IP address of the client device 204 changes in the IP header encapsulating each data packet in the data flow 230 between the client device 204 and the load balancer 202.

In the illustrated scenario, the load balancer 202 does not detect the connection migration event and continues executing the stateless routing logic 214. Consequently, the load balancer 212 misdirects data packets received following the connection migration event to a different server within the local network of the load balancer 202 that is not the owner of the session (e.g., Server A, as shown by the dotted arrow extending from the load balancer 202 to Server A).

In the system 200, each server networked to the load balancer 202 locally executes a routing agent 216. The routing agent 216 reads the connection ID in the header of each data packet received at its host server and determines whether the host server is the owner of the corresponding data flow. If it is determined that the host server of the routing agent 216 is not the owner of a received data flow, the routing agent 216 redirects the data flow to the appropriate owner. In the illustrated scenario, Server A receives the misdirected data packets of the data flow 230 following the connection migration event, reads the connection ID in the header of these data packets, identifies Server B as the rightful owner based on the connection ID, and forwards the data flow 230 to Server B (e.g., as generally shown by the dotted arrow extending from Server A to Server B).

In one implementation, the routing agent 216 performs rerouting actions by accessing a mapping table 218 that maps each of multiple server IDs for the network to a corresponding server IP address. For example, the routing agent 216 queries the mapping table 218 with the server ID 224, from this query, retrieves the IP address for the owner of the misdirected data flow (e.g., Server B). The routing agent 216 then forwards the data packets of the data flow 230 to the IP address retrieved from the mapping table 218. In another information, the server ID 224 is a private IP address of the server that owns the data flow. In this case, the routing agent 216 re-routes the data flow 230 without accessing a mapping table.

Effectively, the system 200 offloads the tasks of managing connection migrations from the load balancer 202 to the backend servers (e.g., Server A through N) of the local network. Whenever a connection migration occurs, the load balancer 202 continues implementing the stateless routing logic 214 and, in a high percentage of events, misdirects subsequently-received data packets of a data flow to a server that is not the rightful owner of the data flow. Because each of the system servers (e.g., Server A through N) independently implements routing logic to read and redirect incoming data flows based on the connection ID, all misdirected data packets are still sent to their rightful owner.

Figure 3:
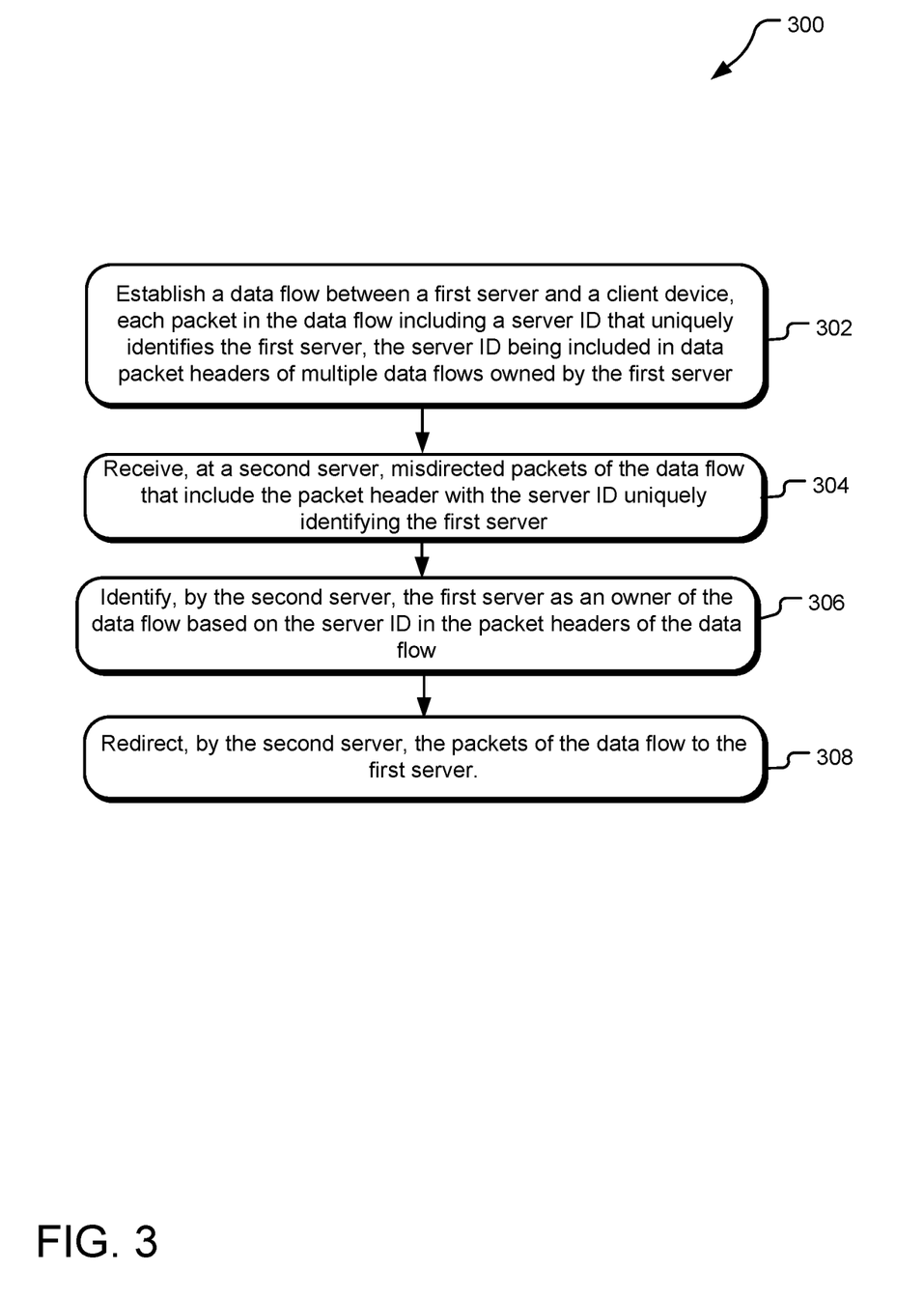
FIG. 3 illustrates example operations for using backend servers in a data center to perform routing actions on data flows affected by connection migration events.

FIG. 3 illustrates example operations 300 for using backend servers in a data center to perform routing actions on data flows affected by connection migration events. An establishing operation 302 establishes a data flow between a first server in a data center and a client device. For example, the data flow is established in response to request from the client device to access a specified destination IP address. A data center load balancer receives the request, selects the first server as the owner of the flow (e.g., based on a load balancing algorithm) and directs the request to the first server. The first server responds to the request with an acknowledgment including information sufficient to establish the data flow, including a connection ID and, in some implementations, an encryption key that allows the client device to decrypt data received as part of the data flow. Following this exchange, all data packets in the established data flow include a data packet header with the connection ID.

In one implementation, the connection ID includes a server ID that uniquely identifies the first server as the owner of the data flow. This connection ID is included in the header of all data packets associated with multiple different data flows owned by the first server (e.g., flows associated with different web sessions and various client devices). The server ID is, for example, a private IP address of the data flow owner (e.g., the first server) or other identifier that can be readily used by other networked severs to discover the private IP address of the data flow owner. In some implementations, the connection ID further includes a session ID that uniquely identifies the data flow from multiple data flows concurrently owned and managed by the same owner.

A receiving operation 304 receives, at a second server, misdirected packets of the data flow. Each of these misdirected data packets includes a packet header with the connection ID uniquely identifying the first server. In one implementation, the misdirected packets are received at the second server following a connection migration of the client device, such as just after the internet connection of the client device handed off between a two different supporting networks, such as from a broadband network provider to a cellular data service provider.

An identification operation 306 provides for identifying, by the second server, the first server as the owner of the data flow based on the connection ID in the packet header. A redirecting operation 308 redirects the redirects the packets of the data flow received at the second server to the first server that has been identified as the owner of the flow. For example, all servers of a same data center locally execute a routing agent that inspects the data packets of all incoming data flows. During this inspection of a received data flow, the routing agent reads the connection ID from the data packet header, extracts the server ID from the connection ID, and uses the server ID to determine the owner of data flow. If the owner of the data flow is not the host server of the routing agent performing the inspection, the routing agent redirects the data flow to the rightful owner.

In some implementations, the server ID includes an IP address of the owner of the corresponding data flow. In this case, the redirecting operation 308 redirects the data flow using the IP address that is included in the server ID. In other implementations, the redirecting operation 308 entails accessing a table that maps each of multiple unique server IDs to an IP address of a corresponding server in a local network. The routing agent uses the server ID extracted from the header information of a data flow to pull, from the mapping table, the IP address of server that owns the data flow. The routing agent then redirects to the data packets to this retrieved IP address.

Figure 4:
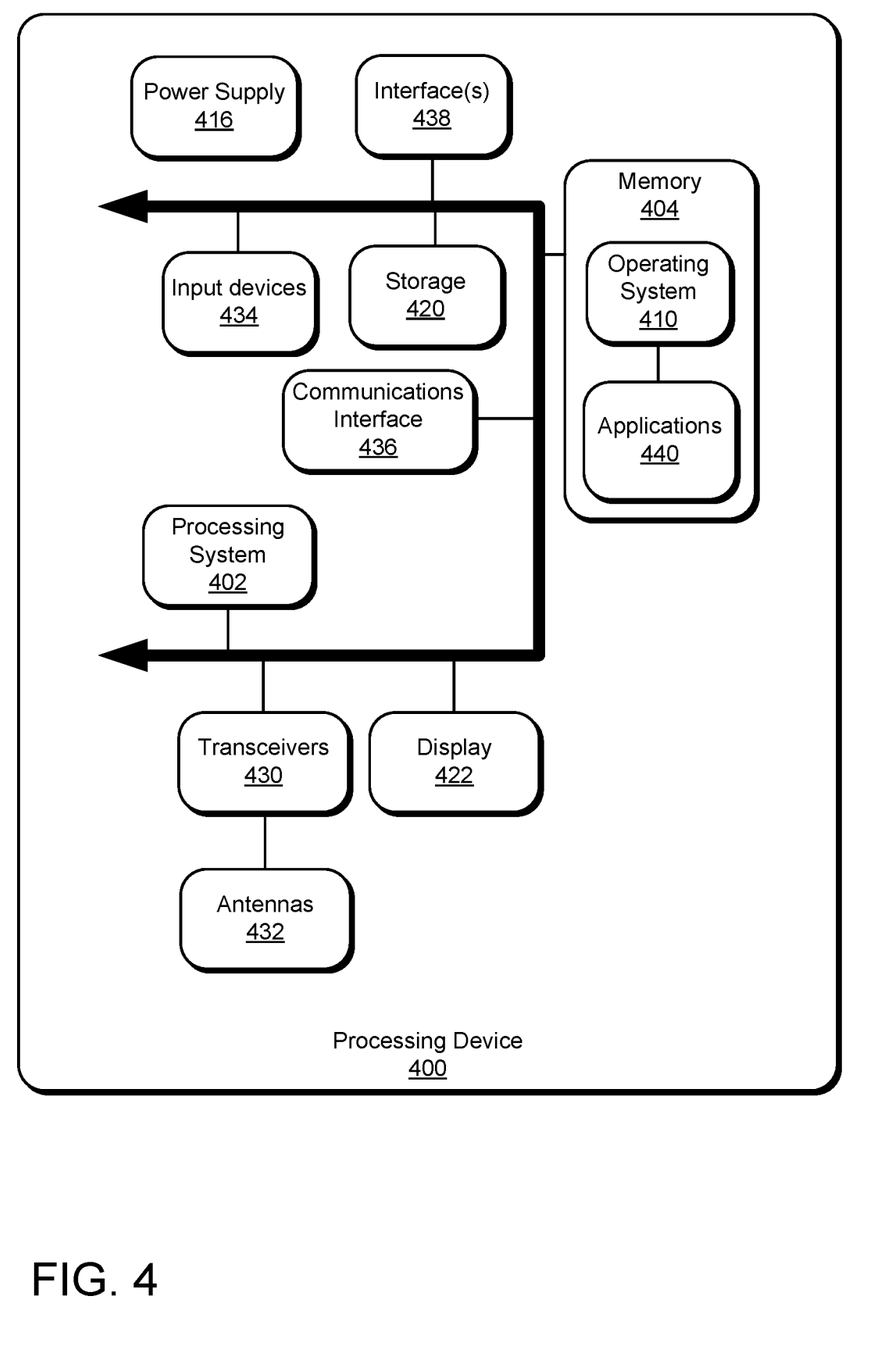
FIG. 4 illustrates an example schematic of a processing device suitable for implementing aspects of the disclosed technology.

FIG. 4 illustrates an example schematic of a processing device 400 suitable for implementing aspects of the disclosed technology. The processing devices 700 includes a processing system 402, memory 404, a display 406, and other interfaces 408 (e.g., buttons). The processing system 402 may each include one or more CPUs, GPUs, etc.

The memory 404 generally includes both volatile memory (e.g., RAM) and non-volatile memory (e.g., flash memory). An operating system 410, such as the Microsoft Windows® operating system or any other operating system, resides in the memory 404 and is executed by the processor unit(s) 402.

One or more applications 412 (e.g., the routing agent 216 of FIG. 2) are loaded in the memory 404 and executed on the operating system 410 by the processor unit(s) 402. The applications 412 may receive inputs from one another as well as from various input local devices such as a microphone 434, input accessory 435 (e.g., keypad, mouse, stylus, touchpad, gamepad, racing wheel, joystick), and a camera 432. Additionally, the applications 412 may receive input from one or more remote devices, such as remotely located servers or smart devices, by communicating with such devices over a wired or wireless network using more communication transceivers 430 and an antenna 438 to provide network connectivity (e.g., a mobile phone network, Wi-Fi®, Bluetooth®). The processing device 400 may also include one or more storage devices 428 (e.g., non-volatile storage). Other configurations may also be employed.

The processing device 400 further includes a power supply 416, which is powered by one or more batteries or other power sources, and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method for distributed flow steering in a cloud-based architecture provides establishing an initial data flow of packets between a first server and a client device. Each packet in the data flow includes a packet header including a server identifier (ID) that uniquely identifies the first server and that is included in data packet headers of multiple data flows owned by the first server. When packets of the data flow are received at a second server, the second server identifies the first server as an owner of the data flow based on the server ID in the packet header and redirects the packets of the data flow back to the first server.

In another example method of any preceding method, the packets of the data flow are received at the second server in response to a connection migration of the client device.

In still yet another example method of any preceding method, each packet in the data flow is formatted according to Quick UDP Internet Connections (QUIC) protocol.

In another example method of any preceding method, the method further comprises: receiving, by a load balancer, a first request from the client device associated with the data flow that is for a first connection to a destination internet protocol (IP) address and selecting, by a load balancer, the first server to serve the client device with the first connection in response to the request. The first server is selected based on one or more tuple characteristics of the client device including: a source internet protocol (IP) address associated with the client device; and a source port associated with the client device.

In another example method of any preceding method, the method includes receiving, by a load balancer, data packets of the data flow following a change in the one or more tuple characteristics of the client device; and directing, by the load balancer, the data packets to the second server based on a newly detected set of the tuple characteristics. In this example, the second server is not the owner of the data flow.

In another example method of any preceding method, the server ID is included in an encrypted connection ID. In still another example method of any preceding method, the method further comprises generating a connection ID at the first server that includes both the server ID, and also a session ID that uniquely identifies the data flow among the multiple data flows owned by the first server.

In still another example method of any preceding method, the first server and the second server are included in a plurality of servers configured to use a connection ID field within each data packet header to re-route data flows misdirected by a load balancer.

In another aspect, some implementations include a computing system that performs distributed flow steering in a cloud-based architecture. The computing system includes hardware logic circuitry that is configured to perform any of the methods described herein.

In yet another aspect, some implementations include a computer-readable storage medium for storing computer-readable instructions. The computer-readable instructions, when executed by one or more hardware processors, perform any of the methods described herein.

An example system for distributed flow steering in a cloud-based architecture includes a means for establishing an initial data flow of packets between a first server and a client device. Each of the packets in the data flow includes a packet header including a server identifier (ID) that uniquely identifies the first server and that is included in data packet headers of multiple data flows owned by the first server. The system further includes a means for receiving, at a second server, packets of the data flow, a means for identifying, at the second server, the first server as an owner of the data flow based on the server ID in the packet header, and a means for redirecting the packets of the data flow back to the first server in response to the identifying operation.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:
1. A method comprising:
  generating, at a first server, a connection ID for a data flow, the connection ID including a server identifier (ID) that uniquely identifies the first server, a session ID that uniquely identifies the data flow among multiple data flows owned by the first server, and a verification value used as a checksum for the server ID and session ID;
  establishing a data flow between the first server and a client device, each packet in the data flow including a packet header including the connection ID;

receiving packets of the data flow at a second server, the packets each including the packet header uniquely identifying the first server;
identifying, by the second server, the first server as an owner of the data flow based on the server ID in the packet header; and
redirecting, by the second server, the packets of the data flow to the first server.

2. The method of claim 1, wherein the packets of the data flow are received at the second server in response to a connection migration of the client device.

3. The method of claim 1, wherein each packet in the data flow is formatted according to Quick UDP Internet Connections (QUIC) protocol.

4. The method of claim 1, further comprising:
receiving, by a load balancer, a first request from the client device associated with the data flow, the first request being for a first connection to a destination internet protocol (IP) address;
selecting, by a load balancer, the first server to serve the client device with the first connection in response to the request, the first server being selected based on one or more tuple characteristics of the client device, the one or more tuple characteristics including:
a source internet protocol (IP) address associated with the client device; and
a source port associated with the client device.

5. The method of claim 4, further comprising:
receiving, by a load balancer, data packets of the data flow following a change in the one or more tuple characteristics of the client device; and
directing, by the load balancer, the data packets to the second server based on a newly detected set of the tuple characteristics, wherein the second server is not the owner of the data flow.

6. The method of claim 1, wherein the first server and the second server are included in a plurality of servers configured to use a connection ID field within each data packet header to re-route data flows misdirected by a load balancer.

7. A system comprising:
a first server configured to transmit data formatted according to a protocol that includes a connection identifier (ID) in each packet header of a data flow, the connection ID including both:
a server ID that uniquely identifies the first server and that is included in data packet headers of multiple data flows owned by the first server; and
a session ID that uniquely identifies the data flow among the multiple data flows owned by the first server; and
a verification value used as a checksum for the server ID and session ID; and
a second server configured to:
receive a data flow of misdirected data packets that each include a packet header with the server ID uniquely identifying the first server;
identify the first server as an owner of the data flow based on the server ID in the packet header; and
redirect the data flow to the first server.

8. The system of claim 7, wherein data flow is received at the second server in response to a connection migration of a client device.

9. The system of claim 7, the protocol is a Quick UDP Internet Connections (QUIC) protocol.

10. The system of claim 7, further comprising:
a load balancer configured to:
receive a first request from a client device associated with the data flow, the first request being for a first connection to a destination internet protocol (IP) address;
select the first server to serve the client device with the first connection to the destination IP address in response to the first request, the first server being selected based on stateless routing logic.

11. The system of claim 10, wherein the load balancer is further configured to:
receive data packets of data flow following a change in a source IP address of the client device; and
misdirect the data packets of the data flow to the second server based on the change in the source IP address.

12. The system of claim 7, wherein the connection ID is unencrypted.

13. The system of claim 7, wherein the first server and the second server are included in a plurality of servers configured to use the connection ID within each data packet header to re-route data flows misdirected by a load balancer.

14. One or more computer-readable storage media encoding computer-executable instructions encoding a computer process comprising:
assigning, by a first server, connection IDs to each of multiple data flows owned by the first server, the connection IDs each including both:
a server ID that uniquely identifies the first server and that is included in a data packet header of each of the multiple data flows owned by the first server; and
a session ID that uniquely identifies a corresponding one of the multiple data flows owned by the first server; and
a verification value used as a checksum for the server ID and the session ID;
identifying, by the first server, a data flow characterized by a data packet header having a connection ID uniquely identifying a second server; and
redirecting the data flow to the second server based on the connection ID.

15. The one or more computer-readable storage media of claim 14, wherein the data flow is owned by the second server and the data flow is misdirected to the first server in response to a connection migration of a client device.

16. The one or more computer-readable storage media of claim 14, wherein each packet in the data flow is formatted according to Quick UDP Internet Connections (QUIC) protocol.

17. The one or more computer-readable storage media of claim 14, wherein the first server is included in a plurality of servers coupled to a load balance, each of the plurality of servers being configured to use a connection ID field within each data packet header to re-route data flows misdirected by the load balancer.

* * * * *